June 25, 1963

P. W. WARREN 3,094,775

METHOD OF BRAZING HONEYCOMB SANDWICH
WITH EDGE MEMBERS AND INSERTS

Filed July 27, 1959

INVENTOR:
Paul W. Warren

By Willard M. Graham

Agent,

June 25, 1963

P. W. WARREN 3,094,775

METHOD OF BRAZING HONEYCOMB SANDWICH
WITH EDGE MEMBERS AND INSERTS

Filed July 27, 1959

INVENTOR:
Paul W. Warren

By Willard M. Graham
Agent.

June 25, 1963   P. W. WARREN   3,094,775
METHOD OF BRAZING HONEYCOMB SANDWICH
WITH EDGE MEMBERS AND INSERTS
Filed July 27, 1959   3 Sheets-Sheet 3
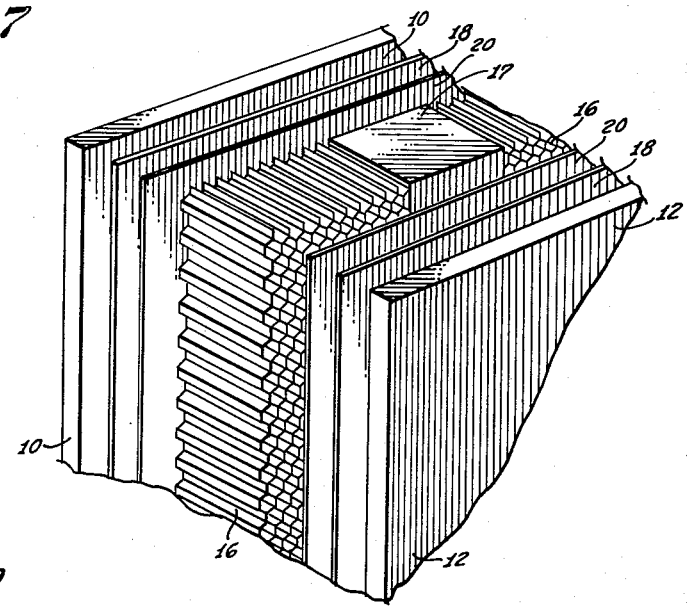
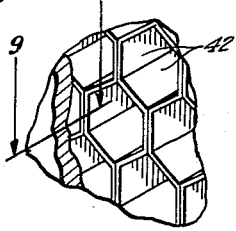
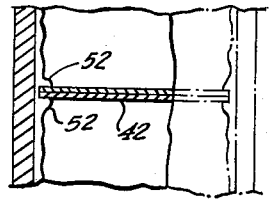
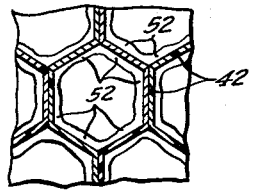
INVENTOR:
Paul W. Warren
By Willard M. Graham
Agent United States Patent Office 3,094,775
Patented June 25, 1963

3,094,775
METHOD OF BRAZING HONEYCOMB SANDWICH WITH EDGE MEMBERS AND INSERTS
Paul W. Warren, Los Angeles, Calif., assignor to Northrop Corporation, Beverly Hills, Calif., a corporation of California
Filed July 27, 1959, Ser. No. 829,705
2 Claims. (Cl. 29—471.1)

This invention has to do with the method or process of providing a metal-to-metal bond of cellular materials and panels.

This is a continuation-in-part of the Paul W. Warren application bearing Serial Number 770,080, filed on October 28, 1958.

Titanium alloys, stainless steels, as well as other metals and/or refractory-like materials have the necessary resistance to oxidation, erosion, radiation, etc., but they must be made into cell-like structures, or sandwich panels, with or without random and/or lattice support elements to provide necessary strength-weight ratios. Various conformations are being developed, including waffle, expanded-metal, grid, corrugated, cell-like, and/or honeycomb designs, all to form the core in a sandwich or partial sandwich-like structure with outer skin or skins of stainless steel, titanium and other materials and random or lattice support elements. Best and most practical thus far is the honeycomb-like material as the sandwich core, with stainless steel, titanium, or other material as the skin. With brazing or welding as the bonding medium to join core to skin, the sandwich structure is strong and heat-resistant enough to handle all current and projected requirements for a few years.

Honeycomb-like structure is an anisotropic (properties differ with direction) integrated, sheet-metal assembly in which the facings and interfaces are the prime load-carrying members. Proper design permits ultimate tensile, bending and compression strengths to be realized, even with very thin faces, because the core provides continuous or controlled discontinuous support to prevent buckling, yet transmits shear stresses. This is true of adhesive-bonded sandwich, but it can withstand only low temperatures limited by the vegetable, plastic bond, while the brazed or welded type can withstand temperatures limited only by the choice of metals or refractory materials.

There are many production and experimental honeycomb shapes. Some have been stitched, eyeletted, slotted, or expanded to make core structure, but one of the commonest methods is resistance welding which is unaffected by brazing or further welding.

Metallurgical brazing (temperature high enough so there is some diffusion of braze metal into base metal), or welding (temperature high enough so there is some metal diffusion at the interface), are thus current methods of joining. This provides large bond areas, distributing stresses uniformly-even strengthening the core itself at joints. Surgically clean parts are a necessity thus far, demanding exceedingly well controlled degreasing, pickling, and general handling.

Basic problems are the positioning of brazing alloy and/or flux, and parts in a proper fixture, accurate holding to insure desired shape and yet achieve metal-to-metal contact of faces and core, controlled heating and cooling rates to avoid warpage and stressing, atmospheric protection to avoid oxidation or contamination of parts and contamination of joints, control of post heat treatment to develop desired metallurgical conditions, sizing, coining, or other plastic deformation to strengthen the part by hot or cold work. These are major problems, because it is relatively difficult to repair brazed or welded sandwich panels. It is preferable or necessary for them to be right throughout the entire process.

An object of this invention is to provide a process or method whereby the components of a honeycomb or cell-like core sandwich structure along with the weld interfaces or brazing alloy will be properly located in such a manner as to provide a metal-to-metal contact.

Another object of this invention is to provide a process or method whereby the heat for brazing, or welding, or heat treating of the materials is very accurately controlled through all stages.

A yet further object of this invention is to provide a method or process whereby the components of a honeycomb or cell-like core sandwich structure will, after being raised to heat to braze or weld, have the cooling rates very accurately controlled in order that warping and undesired distortion will not occur, and that certain plastic shaping may be controlled.

Another object of this invention is to provide a method or process of brazing or welding honeycomb or cell-like core sandwich structure whereby all the components are protected from and free of contaminating conditions such as oxidation and corrosion.

A yet further object of this invention is to provide structure, equipment, and fixtures for brazing or welding honeycomb or cell-like core sandwich structure.

Another object of this invention is to provide a method and structure for brazing or welding honeycomb or cell-like core sandwich structure which is economical and easily used by relatively unskilled or semiskilled labor.

Another object of this invention is to provide a method and structure for brazing or welding honeycomb or cell-like core structure so that various and selectable areas of such structure may have differing amounts of heat impinged upon them, injected into them, or extracted from them depending upon the density of the honeycomb or cell-like structure or various attachments, fittings, edge members, etc., or metallurgical requirements.

A further object of this invention is to provide equipment and a method for brazing or welding honeycomb or cell-like sandwich structure whereby the time factor involved is of such a short duration that little, if any, warping, oxidation, and other undesired results will occur.

Another object of this invention is to provide a method for brazing or welding honeycomb or cell-like core sandwich structure that utilizes a simplified retort structure.

Briefly, the invention comprises preparing the honeycomb or cell-like core sandwich structure and placing the same in a prepared envelope type fixture or retort. The envelope is sealed and the fixture and structure is exposed to a controlled radiant heat source and brazed or welded. Controlled cooling is applied. The brazed structure is removed from the envelope.

FIGURE 7 is an enlarged perspective view illustrating a representative section of honeycomb or cell-like core, brazing foil, skin panels, and retort.

FIGURE 8 is a enlarged perspective view of a section of honeycomb core and the position it is in prior to brazing; it is understood that honeycomb core in all illustrations is being used as representative of a typical cell-like structure which may take other forms, i.e. square, arch, corrugated and other positions in the total structure.

FIGURE 9 is a fragmentary, cross-sectional view taken on line 9—9 of FIGURE 8 looking in the direction indicated and illustrating a section of representative brazed honeycomb core.

FIGURE 10 is an enlarged fragmentary end view of a representative honeycomb core cell as it appears in the brazed condition.

Figure 1:
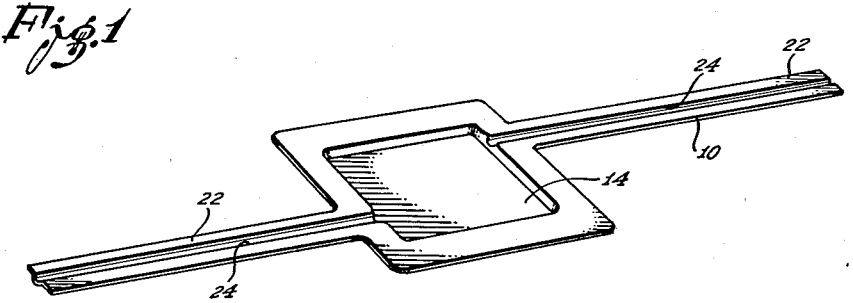
FIGURE 1 is a perspective view illustrating one half of a representative retort.
Figure 2:
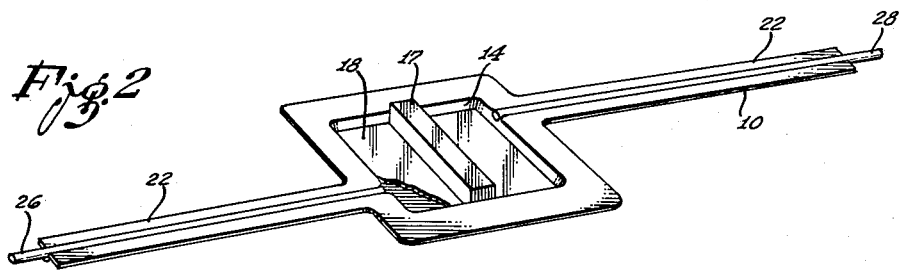
FIGURE 2 is a view similar to FIGURE 1 but illustrating a portion of the purging system in addition to one half of the retort, and a panel of metal, plus a solid metal bar, that may be one side of a sandwich structure.
Figure 3:
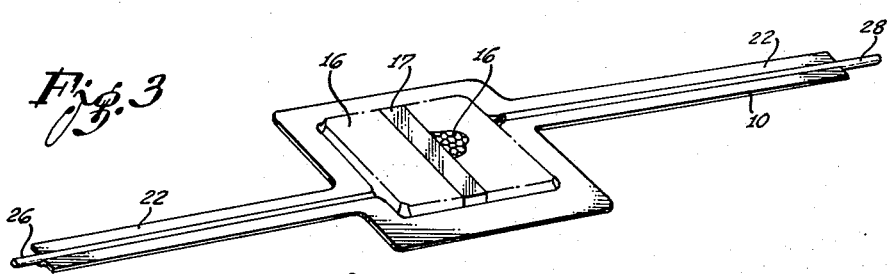
FIGURE 3 is a view illustrating representative components of the sandwich structure located in one half of the envelope or retort.

Referring to the drawings for a more detailed description of the present invention, 10 and 12 designate two halves of a metal retort or envelope 13. Half 10, shown in FIGURES 1 to 4 inclusive, as well as half 12, is fabricated of stainless steel, or other suitable material, and it may be curved or otherwise shaped to resemble the ultimate shape of the product. The brazing or welding temperature will have a great deal to do with retort material and its gage.

The envelope 13 and the two halves 10 and 12 illustrated are merely representative of the many configurations that may be adopted to accommodate many configurations of the final product—a cellular sandwich structure.

A depression 14, having a peripheral dimension that is just slightly larger than the panel to be brazed, is formed in each half of the retort. The size and shape of the depression is to provide support and to provide for expansion or growth of the sandwich structure. Into these depressions are placed the honeycomb or cell-like core sandwich structure and brazing alloy (when used). The sandwich structure consists, in the illustrated form FIGURE 3, of a pair of honeycomb or cell-like core sections 16 cut or machined into the shape desired, and a pair of panels or skins 18. Between the sections 16 is a solid metal bar 17. Again, this illustration of the bar is merely representative of many possible shapes and locations. In place of the bar U-shaped edge members may be used and adopted. Various gages of metal may be incorporated at one time. The bar 17 may be wedge shaped, curved, tapered and the like. Various and sundry types of inserts may be adopted singly or many at one time. The entire end result may be in the form of simple and compound curves as well as wedges. All of these shapes and an infinite variety of others may be incorporated into one end result. Between the panels and the core is placed (when used) a brazing and joining material 20 that may be in either a powder or foil or other condition. The brazing material may be any one of very many that are and may be available. However, again the materials selected are determined by the brazing or welding conditions.

The retort 13 has a pair of arms 22. In each arm is formed a depression 24 and in each depression is located a conduit 26 and 28. These conduits provide a portion of the purging system.

The internal bottom of the depression 14 may or may not be covered with an inhibitor, i.e. a material that will prevent the brazing material 20, when in the liquid state, from adhering to the retort 13.

Figure 4:
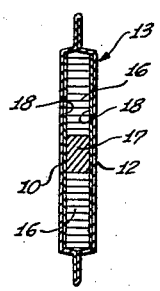
FIGURE 4 is a cross-sectional view illustrating the sealed retort and representative components of a simple sandwich structure located in proper interrelation.

The retort or envelope 13 is closed in the manner illustrated in FIGURE 4. The edges are sealed in any suitable manner such as by welding, to provide a leak tight condition.

When retort 13 is closed it, the outside, may be provided with a coating of heat retaining material, either overall or to a specific pattern related to the sandwich structure enclosed. The coating may have varying degrees of emissivity so as to cause more or less heat absorption in panels of varying thicknesses, or having varying density members included. In addition, a removable mask having cutouts or sections more or less transparent to heat may be placed outside of the envelope or retort for varying times during the brazing or welding cycle to further control the heat absorption and specific patterns on the surface.

It is to be understood that the configuration of the retort 13, core 16, and panels 18 is merely representative. The retort and related sandwich structure may be provided in simple and compound curves. Irregular shapes of all types may also be provided.

Attention is also directed to the fact that only the core 16, panels 18, and brazing material (when used) 20 are in the retort 13.

The next step in the operation, prior to brazing or welding, is the purging of the interior of the assembled retort 13. Conduit 26 may be connected to a source of inert or reducing atmosphere. More than one such conduit may be provided in order to expedite the operation. The atmosphere may be argon, helium or some other equally applicable gas material. However, a feature of importance is that the atmosphere, regardless of its composition, is to be as dry and free of moisture as possible. Otherwise, any moisture breaks down at high temperatures to release oxygen which in turn causes the core 16 and panels 18 to oxidize.

Figure 5:
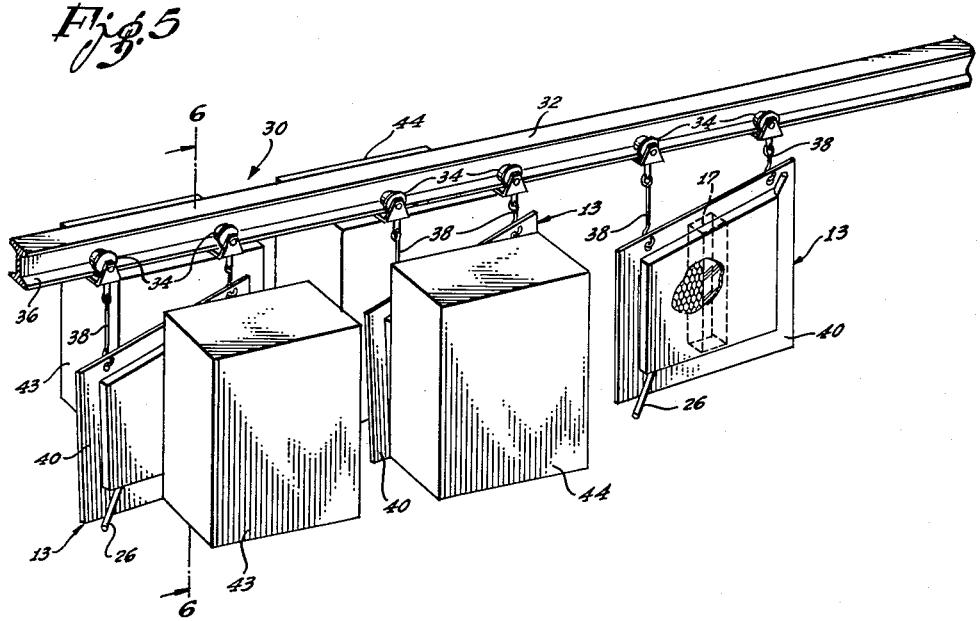
FIGURE 5 is a schematic illustration showing representative equipment and fixtures for brazing or welding honeycomb or cell-like core sandwich structure.

The retort 13 may be purged either in the brazing fixture 30, illustrated in FIGURE 5, or it may be purged prior to being placed in the fixture.

The purging cycle consists of applying as good a vacuum as is possible to obtain. This step draws air and oxygen out of the retort. After the vacuum has been applied then argon gas is flowed or urged into the retort 13 until atmospheric or near atmospheric pressure is obtained. This purging cycle is continued for as many as ten times or, in the alternative, until there is a reasonable certainty that there is substantially no air and oxygen inside the retort 13. The length of time required to purge the envelope will depend on the size and shape thereof as well as on the type of cellular material used. Obviously small envelopes will not require as long to purge as large ones. In order to assure that brazing or welding will occur in an inert atmosphere, the gas constituting such inert atmosphere (as disclosed above) is left inside the retort. However, a negative pressure, i.e. a pressure below atmosphere, should prevail in the retort. This negative pressure tends to clamp or pull all the sandwich structure into a firm metal-to-metal contacting relationship. It further prevents the brazing foil, if foil is used, from slipping out of position.

When bonding sandwich structure it is necessary and essential that all honeycomb core cell walls be attached to the panels 18. Voids are not permitted. If a void occurs the sandwich structure must be rejected.

Therefore, it is important that a vacuum be applied in the retort to provide a good metal-to-metal contacting condition. However, too great a final vacuum will result in the sandwich structure being irregular in the final form. In other words, as one example, the cell structure of the honeycomb will show on the outside of the panel and the panel will obviously be rough. To phrase it in another way, the panel 18 will be drawn too tightly into the cells of the core 16 and a final "waffle" appearance will result. This undulating or irregular surface is not a desirable result. It is therefore essential that the proper vacuum be obtained and held on the last cycle of the purging step. Of course core and panel material as well as gage will determine what is the proper vacuum. Also the general shape of the envelope will be a factor to consider.

If the purging cycle occurs out of the fixture 30 the conduits are sealed tight at the proper time in order to prevent any leakage. On the other hand, if the purging takes place in the bonding fixture 30, to be described, then the conduits 26 and 28 may be continuously connected to the vacuum and inert gas source until the brazing or welding is completed.

Attention is directed to FIGURE 5 of the drawings. The retort 13—illustrated somewhat schematically for the sake of clarity—is shown located in the bonding fixture designated as a whole by the reference numeral 30. However, attention is directed to the fact that the bonding fixture shown in the various figures is schematic and is to be considered only representative. Various and many fixtures may be devised that will perform the proper function.

The fixture illustrated comprises an I beam 32. Individual roller units 34 are located on one flange 36 of the I beam, and from each unit suspends a hook 38. The hooks are inserted in openings in the flanges 40 of the retorts 13 in the manner illustrated. Obviously the roller units 34 are free to roll along flanges 36 when propelled by any suitable means (not shown).

The retort 13 is located in the fixture 30, at the extreme left end, as illustrated in FIGURE 5. It may also be noted that an assembly line fixture is illustrated, i.e. several retorts 13 are located in the fixture 30 at various stations or positions of operation.

The fixture 30 is depicted in FIGURE 5 in a generally horizontal position. Again, this is just for purposes of illustrating schematically a system or method of operation, since the fixture may be in a vertical or other position, and further, the arrangements may be made to move the fixture while the retort remains stationary.

In the event the retort 13 were purged while suspended vertically in the fixture the argon or inert gas, being heavier than air, would tend to force the air up to the top of the retort and out the proper conduit. In other words, a more efficient purging of the retort 13 could be obtained. Additionally, heat which has a tendency to rise would follow the retort from one position or station to the next when vertical movement is used.

Returning to the retort 13 and its position at the extreme left end of the fixture 30. It is to be noted that the retort is suspended in such a manner as to place the sandwich structure in a vertical position. Further, this position is retained throughout the entire operation of brazing or welding. The vertical position of the retort leads to another very distinct advantage which will be pointed out with reference to FIGURE 10 of the drawings.

As before stated, the negative pressure created in the retort 13 in the last step of the purging cycle provides a proper metal-to-metal contact. The honeycomb cell walls 42 are positioned in a biased condition against the foil 20 brazing alloy or other joining material present. The brazing foil 20 is not illustrated in FIGURE 8 for reasons of clarity. When the sandwich structure and retort 13 is suspended in the vertical position and heated till the brazing material turns to liquid, the cell walls 42 function as a dam to prevent the flow of brazing material to the bottom of the retort. This is in direct contrast to the conventional furnace brazing process. In the furnace brazing method the sandwich structure is in the horizontal position and the brazing material flows to the bottom of the sandwich resulting in uneven filleting. There is nothing to prevent or inhibit the flow. As a result there is a very weak brazed area on the upper side of the sandwich structure and a strong brazed area on the bottom. Obviously, a completely undesirable result.

The retort 13 positioned at the left hand end of bonding fixture 30, is located between a pair of quartz lamp radiant heaters and gold reflectors 43 constituting a first or preheating stage. These radiant heaters may be very accurately controlled to provide the desired amount of heat up to the maximum possible. Additionally, the desired amount of heat can be obtained in an extremely short period of time and can be very uniformly distributed or nonuniformly controlled. As illustrated, the radiant heaters 43 may be considered preheaters, i.e. they can be used to bring the temperature of the retort and enclosed structure to a desired heat short of melting the brazing material. Further, the heat source as here applied may be defined as an open walled radiant heat source as distinguished from a furnace which would be defined as a closed walled heat source.

The retort 13 after being preheated is rapidly moved or propelled by any suitable means (not shown) to the second stage or position which provides a second bank or pair of radiant heaters and reflectors 44. Here, the temperature of the radiant heaters, which again has been obtained in a very short time, is such as to cause the brazing material to melt or turn to liquid. The retort is retained in this position only a few seconds of time. As soon as the brazing material has properly dispersed itself about the honeycomb cell walls 42, which will occur in the time allowed, the temperature of the heaters is lowered below the freezing point of the brazing material.

Although the method of operation as previously described refers to a first or preheat stage or position, this stage can, if desired, be dispensed with. On the other hand, more heating stages can be provided if needed or desired.

Further, whether a preheat stage is used or not the control of the heating cycle is very accurately controlled. For optimum results where inserts, such as bar 17 is used, the heat is brought up to peak in stages. In other words, if the brazing temperature is 1750° F. the heat is brought to this temperature in 500° F. increments. The bar 17 will be the controlling factor since it has the greater density. When the temperature of the bar, or other insert, reaches the peak of the predetermined step or increment, the temperature is raised. Again when the bar reaches the new increased increment the temperature is raised until the brazing peak is achieved. At the peak there may or may not be a dwell time. The purpose of the step-by-step heating is the difference in growth of components involved. The bar 17 or other applicable components will not grow or expand as rapidly as the cellular material. Therefore, in order to prevent stresses, strains, and other faults in the final result step-by-step heating is applied. The same comments with regard to cooling and contraction are true in inverse relationship.

Figure 6:
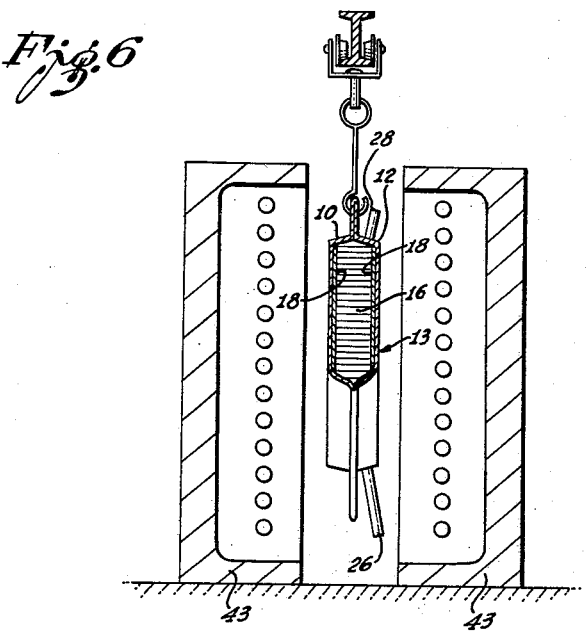
FIGURE 6 is a cross-sectional view taken on line 6—6 of FIGURE 5 looking in the direction indicated.

Both the first and second stage radiant heaters 43 and 44 are identical and, therefore, only one set was illustrated in FIGURE 6.

Attention is directed to FIGURES 9 and 10. It is to be noted that when the sandwich structure is brazed, the fillets 52 about each cell wall 42 are uniform. No more brazing material is located about one cell wall than about the other. It can thus be seen how each wall 42 of each honeycomb cell functions as a dam to prevent undesired flow of brazing material.

Finally, after the retort 13 is properly cooled, the retort is removed from about the sandwich structure. The cooling procedure that provides satisfactory results is the inverse of the heating operation. The heat is reduced in increments.

The entire operation from the step of purging to removing the brazed or welded structure from the retort 13 consumes very little time as compared to other conventional brazing systems and equipment.

To recapitulate, the operation of the invention is as follows: The honeycomb core 16 and panels 18, as well as brazing material 20 are placed in a prepared retort 13. The retort is sealed, leak tight, and purged by alternately applying a vacuum and then an inert gas.

The retort is placed in a vertical position in a brazing fixture 30 and submitted to a carefully controlled radiant lamp heat source. There may or may not be applied a preheat stage. The retort and enclosed structure is heated, through a series of steps, until the brazing material melts and flows about the honeycomb cell walls 42. Carefully controlled cooling through a series of steps is applied until room temperature is reached or in the alternative until further metal contraction is stopped.

The brazed sandwich structure is then removed from the retort.

When the structure is welded, substantially the same sequence of events as recited above follows. However, the brazing material is omitted and may or may not be substituted by the use of a solid or semi-solid reducing agent consisting of a eutectic alloy of the structure itself, or of an intermediate alloy when the structure consists of more than one kind of metal. In addition, positive pressure can be used during the welding cycle so as to control the contact between the honeycomb or cell-like core structure and the skin or skins so as to effect the heat transfer and/or electrical conductivity or resistivity.

While in order to comply with the statute, the invention has been described in language more or less specific as to structural features, it is to be understood that the invention is not limited to the specific features shown, but that the means and constructions herein disclosed comprise a preferred form of putting the invention into effect, and the invention is therefore claimed in any of its forms or modifications within the legitimate and valid scope of the appended claims.

What is claimed is:

1. A method of bonding together an integrated sandwich structure that includes sections of thin gage cellular core arranged in combination with heavy gage reinforcing members assembled with the edges of the core walls perpendicular to and contacting facing surfaces of panels positioned on each side of said combination, said reinforcing members also having surfaces thereof contacting said facing surfaces of said panels, which comprises: inserting a fusible material between all contacting surfaces of said combination, sealing said combination to be bonded within mating halves of a thin walled flexible metallic envelope the interior of which is shaped to conform to the exterior shape of said sandwich combination, purging the envelope interior of atmosphere, injecting non-oxidizing gas into said envelope interior, the pressure of said non-oxidizing gas being less than atmospheric, gradually heating said envelope by controlled discrete temperature stages so that said heavy gage members and cellular core are maintained at substantially the same elevated temperature at all times to reduce warpage therebetween, while said envelope is vertically positioned so that said core walls are horizontal relative to said facing surfaces of said panels, said heating continuing to a sufficiently elevated temperature to melt said fusible material while said contacting surfaces are in said vertical position so that the core walls define flow controlling dams to induce controlled uniform distribution of said fusible material between the facing surfaces of said panels and contacting edges and surfaces of said combination, removing said envelope from heat, simultaneously compressing the bonded surfaces of said combination together and cooling said envelope in controlled discrete stages, and removing said combination from said envelope.

2. A method of bonding together an integrated sandwich structure that includes sections of thin gage cellular core arranged in combination with heavy gage reinforcing members assembled with the edges of the core walls perpendicular to and contacting the facing surfaces of panels positioned on each side of said combination, said reinforcing members also having surfaces thereof contacting said facing surfaces of said panels, which comprises: inserting a fusible material between all contacting surfaces of said combination, sealing said combination within mating halves of a thin walled flexible metallic envelope the interior of which is shaped to conform to the exterior shape of said sandwich combination, purging the envelope interior of atmosphere, injecting a quantity of non-oxidizing gas into said envelope interior to inhibit oxidation of said combination therein, the pressure of said non-oxidizing gas being less than atmospheric, heating said envelope in controlled incremental temperature stages so that said heavy gage members and cellular core are constantly maintained at substantially the same elevated temperature to reduce differential expansion between said core and said reinforcing members, continuing said heating to a sufficiently elevated temperature to melt said fusible material while said contacting surfaces are vertically positioned whereby the core walls define flow restricting dams to induce uniform distribution of said fusible material between the facing surfaces of said panels and contacting edges and surfaces of said combination, removing said envelope from heat, simultaneously compressing the bonded surfaces of said assembly together and gradually cooling said assembly while under compression, and removing said sandwich combination from said envelope.

References Cited in the file of this patent

UNITED STATES PATENTS

| | | |
|---|---|---|
| 485,017 | Ries | Oct. 25, 1892 |
| 1,764,271 | Leonard | June 17, 1930 |
| 2,366,164 | Weick | Jan. 2, 1945 |
| 2,427,747 | Schneider | Sept. 23, 1947 |
| 2,614,517 | Peterson | Oct. 21, 1952 |
| 2,722,735 | Beamish | Nov. 8, 1955 |
| 2,813,502 | Drom | Nov. 19, 1957 |
| 2,845,698 | Giovannucci | Aug. 5, 1958 |
| 2,926,761 | Herbert | Mar. 1, 1960 |

FOREIGN PATENTS

| | | |
|---|---|---|
| 1,162,692 | France | Apr. 14, 1958 |

OTHER REFERENCES

The Tool Engineer, September 1958, pages 98–100.